(12) United States Patent
Tanaka

(10) Patent No.: US 11,152,693 B2
(45) Date of Patent: Oct. 19, 2021

(54) ANTENNA DEVICE

(71) Applicant: YOKOWO CO., LTD., Tokyo (JP)

(72) Inventor: Masato Tanaka, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 9 days.

(21) Appl. No.: 16/609,751

(22) PCT Filed: Jul. 27, 2018

(86) PCT No.: PCT/JP2018/028239
§ 371 (c)(1),
(2) Date: Oct. 31, 2019

(87) PCT Pub. No.: WO2019/031270
PCT Pub. Date: Feb. 14, 2019

(65) Prior Publication Data
US 2020/0067181 A1 Feb. 27, 2020

(30) Foreign Application Priority Data

Aug. 7, 2017 (JP) .............................. JP2017-152359

(51) Int. Cl.
H01Q 1/32 (2006.01)
H01Q 9/30 (2006.01)
H01Q 13/10 (2006.01)
H04W 4/40 (2018.01)

(52) U.S. Cl.
CPC ............ *H01Q 1/3275* (2013.01); *H01Q 9/30* (2013.01); *H01Q 13/10* (2013.01); *H04W 4/40* (2018.02)

(58) Field of Classification Search
CPC .......... H01Q 1/3275; H01Q 1/48; H01Q 9/30; H01Q 9/42; H01Q 13/10; H01Q 21/30
See application file for complete search history.

(56) References Cited

U.S. PATENT DOCUMENTS 6,043,785 A    3/2000  Marino
7,408,518 B2*  8/2008  Minard ............... H01Q 1/2275
                                                 343/700 MS (Continued)

FOREIGN PATENT DOCUMENTS

DE   20 2014 002 207 U1   5/2014
JP         6-188610 A     7/1994

(Continued)

OTHER PUBLICATIONS

International Search Report and Written Opinion dated Oct. 16, 2018 for PCT/JP2018/028239 filed on Jul. 27, 2018, 11 pages including English Translation of the International Search Report.

(Continued)

*Primary Examiner* — Hoang V Nguyen
(74) *Attorney, Agent, or Firm* — Xsensus LLP

(57) ABSTRACT

An antenna device includes an antenna board in which a conductor pattern is provided on each of both surfaces of a dielectric substrate. A linear element is provided on a first surface of the dielectric substrate. A slit antenna is provided on a second surface of the dielectric substrate opposite to the first surface. When the first surface and the second surface are superimposed on each other, the linear element and a slit of the slit antenna overlap with each other.

8 Claims, 10 Drawing Sheets

(56) References Cited

U.S. PATENT DOCUMENTS

| | | | |
|---|---|---|---|
| 7,701,407 B2* | 4/2010 | Kanno | H01Q 5/385 343/767 |
| 2007/0171140 A1 | 7/2007 | Minard et al. | |
| 2008/0284670 A1 | 11/2008 | Kanno et al. | |
| 2008/0284671 A1 | 11/2008 | Kanno | |
| 2009/0231215 A1 | 9/2009 | Taura | |
| 2014/0292593 A1* | 10/2014 | Thiam | H01Q 9/0421 343/713 |
| 2015/0236404 A1* | 8/2015 | Choi | H01Q 5/371 343/722 |
| 2017/0149123 A1* | 5/2017 | Kim | H01Q 1/1214 |

FOREIGN PATENT DOCUMENTS

| | | |
|---|---|---|
| JP | 8-23224 A | 1/1996 |
| JP | 2006-523973 A | 10/2006 |
| JP | 2008-283252 A | 11/2008 |
| JP | 2015-41994 A | 3/2015 |
| WO | 2007/058230 A1 | 5/2007 |
| WO | 2008/065995 A1 | 6/2008 |
| WO | 2016/072035 A1 | 5/2016 |

OTHER PUBLICATIONS

Cheng, S., et al., "Body Surface Backed Flexible Antennas for 17 GHz Wireless Body Area Networks Sensor Applications," 2007 European Conference on Wireless Technologies, IEEE, Oct. 8, 2007, pp. 55-58.

Extended European Search Report dated Apr. 7, 2021 in corresponding European Patent Application No. 18843211.6.

* cited by examiner

1 ANTENNA DEVICE

1 ANTENNA DEVICE

— WITH BANDPASS FILTER
---- WITHOUT BANDPASS FILTER

1A ANTENNA DEVICE

1A ANTENNA DEVICE

ANTENNA DEVICE

CROSS-REFERENCE TO RELATED APPLICATIONS

The present application is based on PCT filing PCT/JP2018/028239, filed Jul. 27, 2018, which claims priority to JP 2017-152359, filed Aug. 7, 2017, the entire contents of each are incorporated herein by reference.

TECHNICAL FIELD

The present invention relates to an antenna device that is installed in a vehicle and used for V2X (Vehicle-to-X, Vehicle-to-Everything) communication (e.g., a vehicle-to-vehicle communication and a road-to-vehicle communication), etc. In particular, the present invention relates to a vehicular antenna device that includes an antenna board in which a slit antenna is provided.

BACKGROUND ART

Conventional antennas of the above kind includes a dipole antenna that is pattern-printed on a board as a V2X communication antenna. However, a conductor transmission line is necessary to feed power to the dipole antenna. In particular, a dipole antenna that is installed vertically has a problem that its radiation pattern is prone to be distorted due to the presence of the transmission line to deteriorate its performance because an antenna element and the transmission line tend to be arranged parallel with each other. This means a disadvantage that it is difficult to design the antenna device including the transmission line so as to avoid deterioration of the performance of the dipole antenna.

CITATION LIST

Patent Literature

Patent document 1: JP-A-6-188610
Patent document 1 is an example in which a dipole antenna is provided on a printed board.

SUMMARY OF INVENTION

Technical Problem

The present invention has been made with recognition of the above circumstances, and an object of the invention is therefore to provide an antenna device that can be designed easily.

Solution to Problem

One aspect of the present invention is an antenna device. This antenna device includes an antenna board in which a conductor pattern is provided on each of both surfaces of a dielectric substrate, wherein a linear element is provided on a first surface of the dielectric substrate, a slit antenna is provided on a second surface of the dielectric substrate opposite to the first surface, and when the first surface and the second surface are superimposed on each other, the linear element and a slit of the slit antenna overlap with each other.

It is preferable that the slit antenna includes plural slits.

It is preferable that the slit antenna includes a parasitic slit that does not overlap with the linear element when the first surface and the second surface are superimposed on each other.

It is preferable that the antenna board is erected perpendicular to and fixed to an attachment member, that the slit antenna includes a first slit that overlaps with the linear element at a first crossing portion and a second slit that overlaps with the linear element at a second crossing portion when the first surface and the second surface are superimposed on each other, and that a distance from a feeding point, located on a side of the attachment member, of the linear element to the second crossing portion is shorter than a distance from the feeding point to the first crossing portion.

It is preferable that the slit antenna includes a first slit that overlaps with the linear element at a first crossing portion and a second slit that overlaps with the linear element at a second crossing portion when the first surface and the second surface are superimposed on each other, that a direction in which the linear element gets across the first slit is the same as a direction in which the linear element gets across the second slit, and that a distance from a feeding point of the linear element to the second crossing portion is equal to a distance from the feeding point to the first crossing portion.

It is preferable that when the first surface and the second surface are superimposed on each other, a direction in which the linear element gets across the first slit is opposite to a direction in which the linear element gets across the second slit, and that the distance from the feeding point of the linear element to the second crossing portion is shorter than the distance from the feeding point to the first crossing portion by an odd number multiple of $\lambda/2$, where the odd number is larger than or equal to 1 and $\lambda$ is an effective wavelength of an operation frequency of the slit antenna.

It is preferable that when the first surface and the second surface are superimposed on each other, a direction in which the linear element gets across the first slit is the same as a direction in which the linear element gets across the second slit, and that the distance from the feeding point of the linear element to the second crossing portion is shorter than the distance from the feeding point to the first crossing portion by an integer multiple of $\lambda$, where the integer is larger than or equal to 1 and $\lambda$ is an effective wavelength of an operation frequency of the slit antenna.

It is preferable that the antenna board operates at a frequency that is different from an operation frequency of the slit antenna.

It is preferable that the antenna device further includes a capacitance loading element, wherein the antenna board be spaced from the capacitance loading element in a front-rear direction of the antenna board.

Any combinations of the above constituent elements and what are obtained by converting expressions of the invention between methods, systems, etc. are also effective embodiments of the invention.

Advantageous Effects of Invention

In the antenna device according to the invention, the linear element is provided on the first surface of the dielectric substrate, the slit antenna is provided on the second surface opposite to the first surface of the dielectric substrate, and the linear element and the slit antenna coupled to each other such that the linear element and a slit or slits of the slit antenna overlap with each other when the first surface and the second surface are superimposed on each other. As a result, the slit antenna can operate without providing a transmission line on the second surface of the dielectric substrate and the antenna device can be designed easily because the slit antenna involves the linear element.

DESCRIPTION OF EMBODIMENTS

Figure 1:
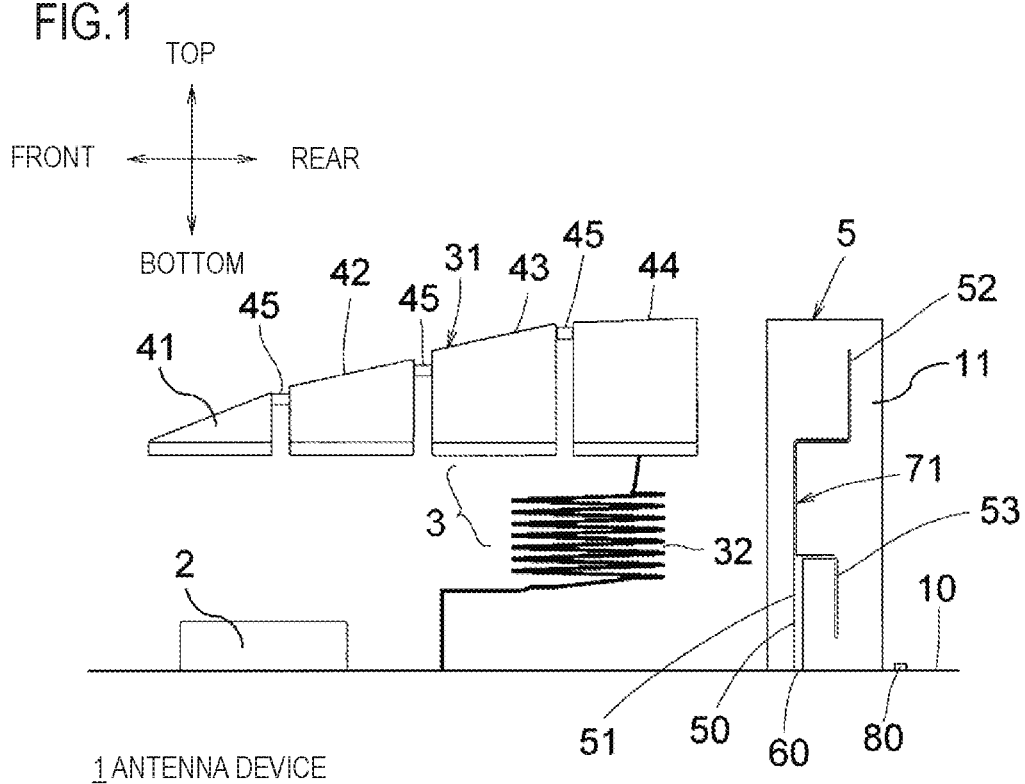
FIG. 1 is a left side view, with its head located on the front side, of an antenna device according to a first embodiment of the present invention (a case is omitted).

Preferred embodiments of the present invention will he hereinafter described in detail with reference to the drawings. The same or equivalent constituent elements, members, treatment/working processes, or the like shown in the drawings are given the same symbol and redundant descriptions therefor will be avoided as appropriate. The embodiments are just examples and are not intended to restrict the invention.

Embodiment 1

An antenna device according to a first embodiment of the invention will be described with reference to FIGS. 1-7. As shown in these drawings, in the antenna device 1, a GNSS antenna (a patch antenna) 2, an AM/FM broadcast reception antenna 3, and an antenna board 5 in which a V2X communication slit antenna is provided are installed on a circuit board 10 which is fixed to an antenna base (not shown), so as to be arranged in this order from the front side. The circuit board 10 has attachment members for fixing the GNSS antenna 2, the AM/FM broadcast reception antenna 3, and the antenna board 5. These constituent elements are housed in an internal space that is surrounded by the antenna base and a radio wave transmissive case (a radome) which covers the antenna base from above. The GNSS antenna 2, which is equipped with a radiation electrode provided on a top surface and has upward directivity, is fixed to the circuit board 10 via an attachment member. The GNSS antenna 2 may be fixed to a circuit board that is different from the circuit board 10. As shown in FIG. 1, the front side and the rear side of the antenna device 1 are defined as the destination sides of the leftward direction and the rightward direction on the paper surface, respectively, and the top side and the bottom side of the antenna device 1 are defined as the destination sides of the upward direction and the downward direction on the paper surface, respectively. The following description will be made according to these definitions.

Figure 3:
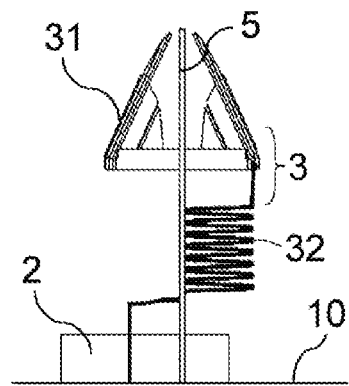
FIG. 3 is a rear view of the same with the case omitted.
Figure 4:
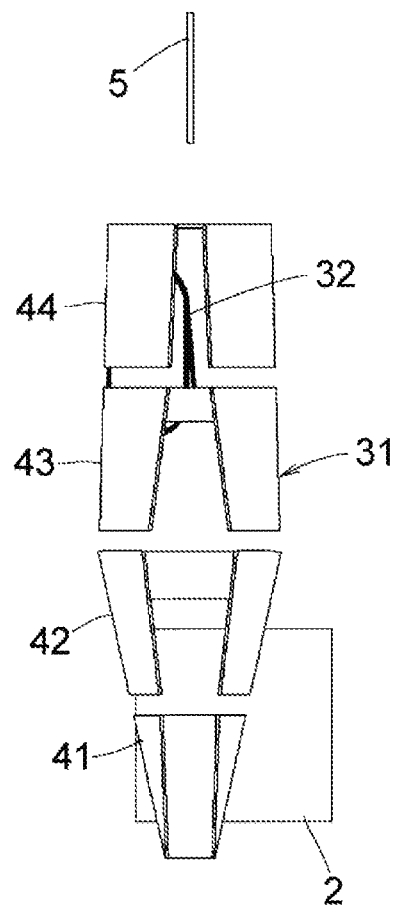
FIG. 4 is a plan view of the same with the case omitted.

The AM/FM broadcast reception antenna 3 has a capacitance loading element 31 and a coil 31 which is directly connected to the capacitance loading element 31. The capacitance loading element 31 is supported by support means on the antenna base. As shown in FIGS. 3 and 4, the capacitance loading element 31 has no top portion and is configured such that bottom edges of divisional bodies opposed to each other in the left-right direction are connected to each other and it is divided in the front-rear direction. That is, the capacitance loading element 31 is configured such that adjacent ones of divisional bodies 41, 42, 43, and 44 each of which is so shaped as to be obtained by connecting mountain-slope-like conductor plates to each other at the bottom are connected to each other by a filter 45. The filter 45 exhibits a low impedance in an AM/FM broadcast frequency band and a high impedance in respective operation frequency bands of the GNSS antenna 2 and the antenna board 5. That is, in the AM/FM broadcast frequency band, the divisional bodies 41, 42, 43, and 44 can be regarded as being connected to each other to form a single large conductor. The top end of a coil 32 is connected to the capacitance loading element 31 and the bottom end of the coil 32 is connected to the circuit board 10.

Figure 17:
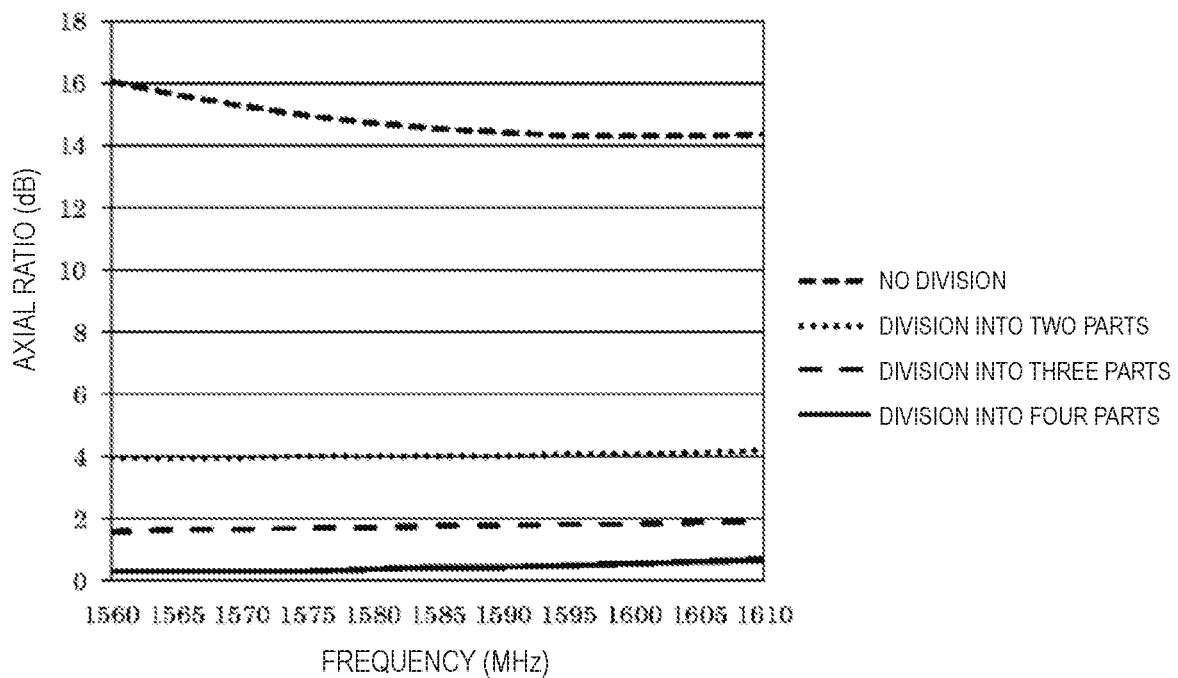
FIG. 17 is a frequency characteristic diagram showing how the axial ratio of a GNSS antenna varies with the division number of a capacitance loading element.
Figure 18:
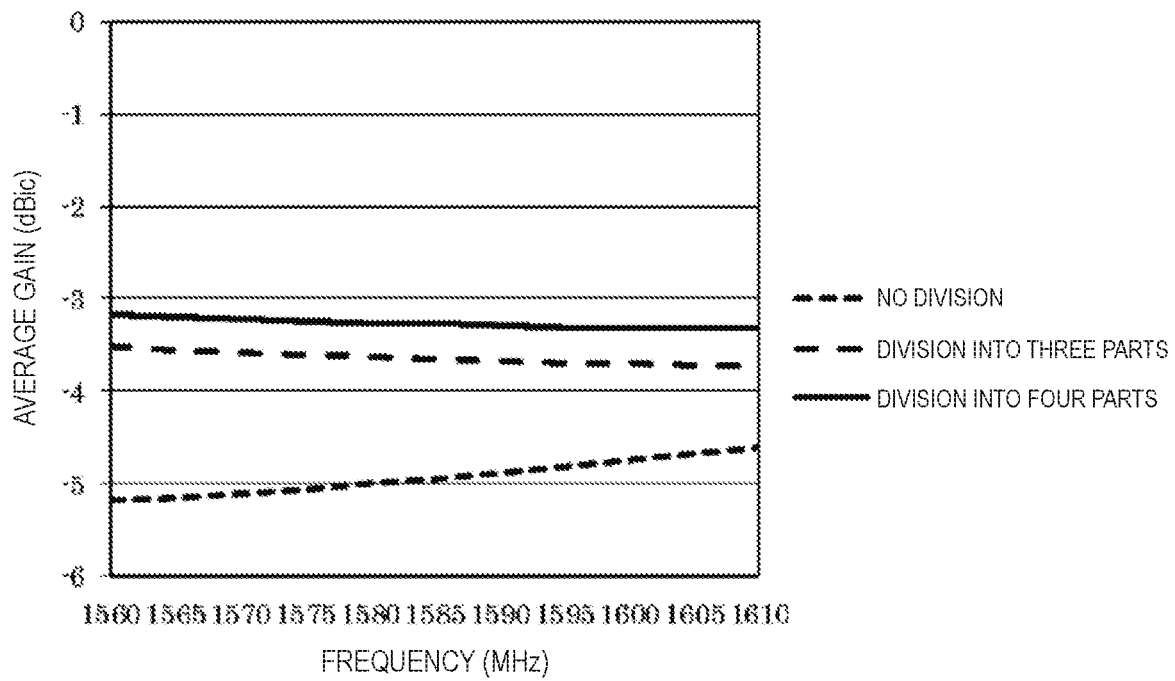
FIG. 18 is a frequency characteristic diagram showing how the average gain of the GLASS antenna varies with the division number of the capacitance loading element.

In the first embodiment, although the GNSS antenna 2 is disposed under the capacitance loading element 31, influence of the capacitance loading element 31 is alleviated because the capacitance loading element 31 is divided. FIG. 17 shows a relationship between the division number of the capacitance loading element and the axial ratio of the GNSS antenna 2. Although the axial ratio is not good when the capacitance loading element is not divided (i.e., the capacitance loading element is a single, large-area conductor plate), the axial ratio becomes smaller and better as the division number is increased in order of two, three, and four (corresponding to the capacitance loading element 31 of the first embodiment). FIG. 18 shows a relationship between the division number of the capacitance loading element and the average gain of the GNSS antenna 2. The average gain is small when the capacitance loading element is not divided, and the average gain increases as the division number is increased in order of three and four (corresponding to the capacitance loading element 31 of the first embodiment).

Figure 5:
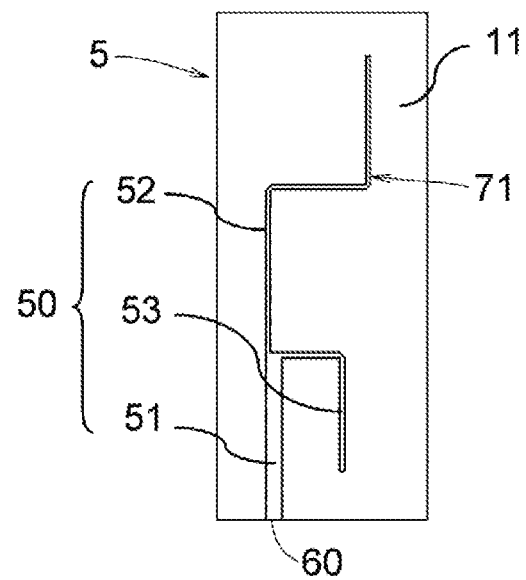
FIG. 5 is a left side view, with its head located on the front side, of an antenna board employed in the first embodiment in which a slit antenna is provided.
Figure 6:
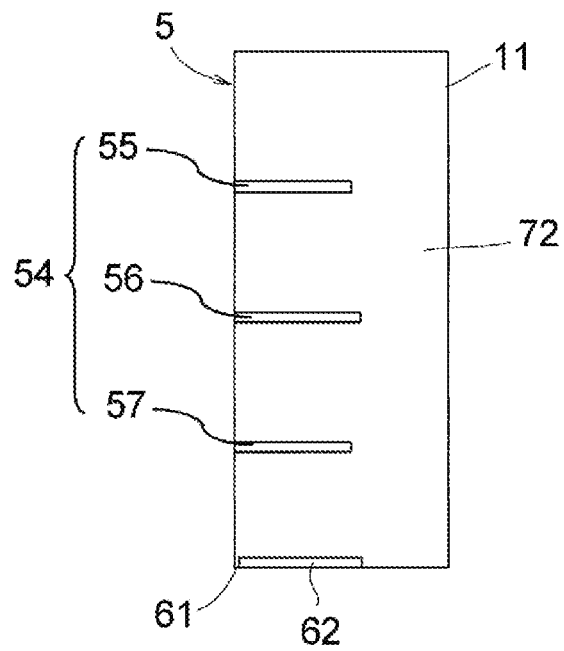
FIG. 6 is a right side view, with its head located on the front side, of the same antenna board.
Figure 7:
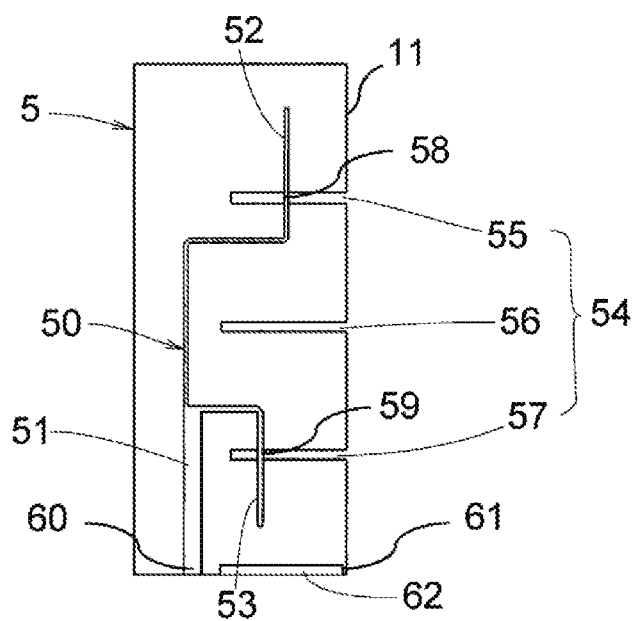
FIG. 7 is an explanatory diagram that is a superimposition of the left side view (FIG. 5) and the right side view (FIG. 6) of the antenna board.

The antenna board 5 having the V2X communication slit antenna 54 is fixed to an attachment member of the circuit board 10 so as to be erected from the attachment member perpendicularly. As shown in FIGS. 5-7, in the antenna board 5, a linear element 50 and the slit antenna 54 which is coupled to the linear element 50 are constructed by a conductor pattern provided on each of both surfaces of a dielectric substrate 11 by printing of the conductor pattern, etching of a conductor foil, or the like. The slit antenna 54 has a configuration that it has a slit which is open at only one end and is surrounded by a conductor except the one end and the slit is fed with power. That is, the slit antenna 54 has a slit which one end is open and the other end is closed. On the other hand, slot antennas are known that are similar in configuration to the slit antenna 54 but operate differently than it. Slot antennas have a configuration that a slot is surrounded fully by a conductor and fed with power. That is, slot antennas have a slot that is closed at both ends.

In this example, a first conductor pattern 71 is provided as the linear element 50 on the left side surface of the dielectric substrate 11. The linear element 50 has a common linear element portion 51, a first branch linear element portion 52, and a second branch linear element portion 53. The common linear element portion 51 is wider than the first branch linear element portion 52 and the second branch linear element portion 53. A bottom end portion of the common linear element portion 51 reaches the bottom edge of the dielectric substrate 11 and serves as a first feeding end portion 60 that is a feeding point for feeding a signal in the 5.9-GHz band for V2X communication. As seen from FIGS. 1 and 2, the first feeding end portion 60 is located at a position that is lower than the radiation electrode surface of the GNSS antenna 2.

A second conductor pattern 72 is provided on the almost entire surface of the right side surface of the dielectric substrate 11 shown in FIG. 6, and the slit antenna 54 is portions where the second conductor pattern 72 is not provided, that is, a first slit 55, a parasitic slit 56, and a second slit 57. The length of each of the first slit 55, the parasitic slit 56, and the second slit 57 is $\mu/4$, where is an effective wavelength at a V2X communication operation frequency (5.9-GHz band) on the dielectric substrate 11. The interval between the first slit 55 and the parasitic slit 56 in the height direction of the dielectric substrate 11 is $\lambda/4$, and the interval between the parasitic slit 56 and the second slit 57 in the height direction of the dielectric substrate 11 is also $\lambda/4$. Thus, the distance between the first slit 55 and the second slit 57 is $\lambda/2$.

The antenna board 5 operates as a monopole antenna at frequencies in the 925-MHz band which is used in remote control systems (e.g., Keyless Entry Systems, Remote Start Systems, and Bi-directional Remote Engine Starters) in addition to frequencies in the 5.9-GHz band which is used for V2X communication. Let $\lambda_k$ represent an effective wavelength at a frequency in the 925-MHz band on the dielectric substrate 11; then the height of the antenna board 5 is set at $\lambda_k/4$. A second feeding end portion 61 which is a feeding point for allowing the antenna board 5 to serve as a monopole antenna is provided at a bottom end portion of the second conductor pattern 72. To form the second feeding end portion 61 at a rear end portion of the bottom edge of the dielectric substrate 11, a conductor-less portion 62 where no part of the conductor pattern is provided is provided so as to extend along the bottom edge of the dielectric substrate 11.

Figure 2:
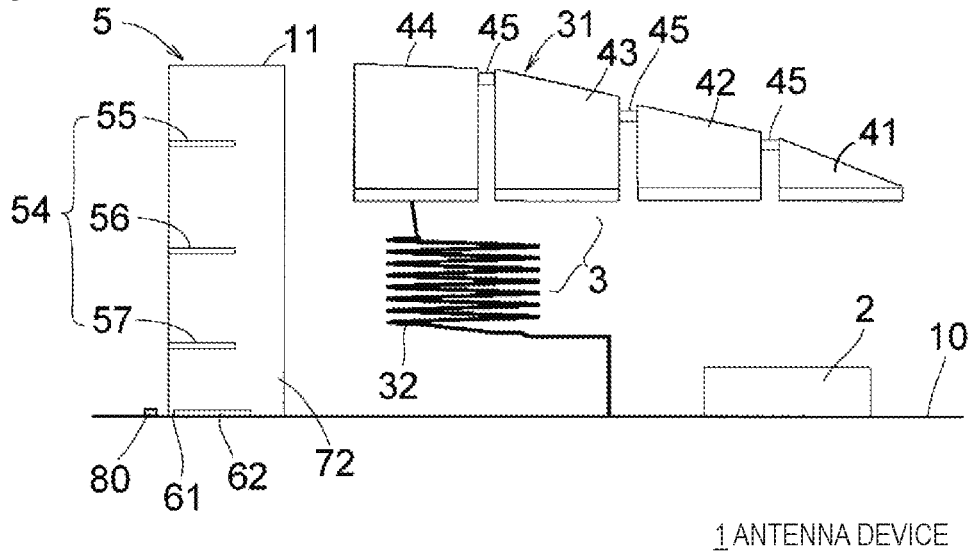
FIG. 2 is a right side view, with its head located on the front side, of the same (the case is omitted).

FIG. 7 is an explanatory diagram that is a superimposition of the left side view (FIG. 5) and the right side view (FIG. 6) of the antenna board 5. The first branch linear element portion 52 crosses (overlaps with) the first slit 55 at a first crossing portion 58 by getting across the first slit 55 from below to above. The second branch linear element portion 53 crosses (overlaps with) the second slit 57 at a second crossing portion 59 by getting across the second slit 57 from above to below. The length of a tip portion, going upward from the first crossing portion 58, of the first branch linear element portion 52 (i.e., an end portion opposite to the position where the first branch linear element portion 52 branches off the common linear element portion 51) is $\lambda/4$. The length of a tip portion, going downward from the second crossing portion 59, of the second branch linear element portion 53 (i.e., an end portion opposite to the position where the second branch linear element portion 53 branches off the common linear element portion 51) is $\lambda/4$. The length of a portion of the second branch linear element portion 53 from the point where it branches off the common linear element portion 51 to the second crossing portion 59 is shorter than the length of a portion of the first branch linear element portion 52 from the point where it branches off the common linear element portion 51 to the first crossing portion 58 by $\lambda/2$. This setting is made for a reason that since the first branch linear element portion 52 gets across the first slit 55 from below to above and the second branch linear element portion 53 gets across the second slit 57 from above to below, to render the first slit 55 and the second slit 57 in phase it is necessary to make the first crossing portion 58 and the second crossing portion 59 in opposite phase. As seen from FIG. 7, the linear element 50 does not cross the parasitic slit 56.

Where the antenna board 5 is used as the slit antenna 54 for V2X communication, a signal in the 5.9-GHz band is supplied to the first feeding end portion 60 which is the bottom end portion of the common linear element portion 51 via the circuit board 10. Where the antenna board 5 is used in a remote control system, a signal in the 925-MHz band is supplied using the second feeding end portion 61 which is the bottom end portion of the second conductor pattern 72 on the right side surface of the dielectric substrate 11. Thus, the second feeding end portion 61 which is the bottom end portion of the second conductor pattern 72 cannot be directly connected the ground (GND) of the circuit board 10, in other words, the ground of the antenna base (not shown). Thus, as shown in FIGS. 1 and 2, a bandpass filter 80 is mounted on the circuit board 10 in the vicinity of a portion to which the second feeding end portion 61 is connected. The bandpass filter 80 keeps the second feeding end portion 61 in a high-impedance state with respect to the ground for a signal in the 925-MHz band for a remote control system, and exhibits a low impedance to make the voltage of the second feeding end portion 61 substantially equal to the ground level in the 5.9-GHz hand (at an operation frequency of the slit antenna 54) for V2X communication. One end of the bandpass filter 80 is connected to the second feeding end portion 61 and the other end of the bandpass filter 80 is grounded via the circuit board 10 (i.e., connected to the ground).

Figure 8:
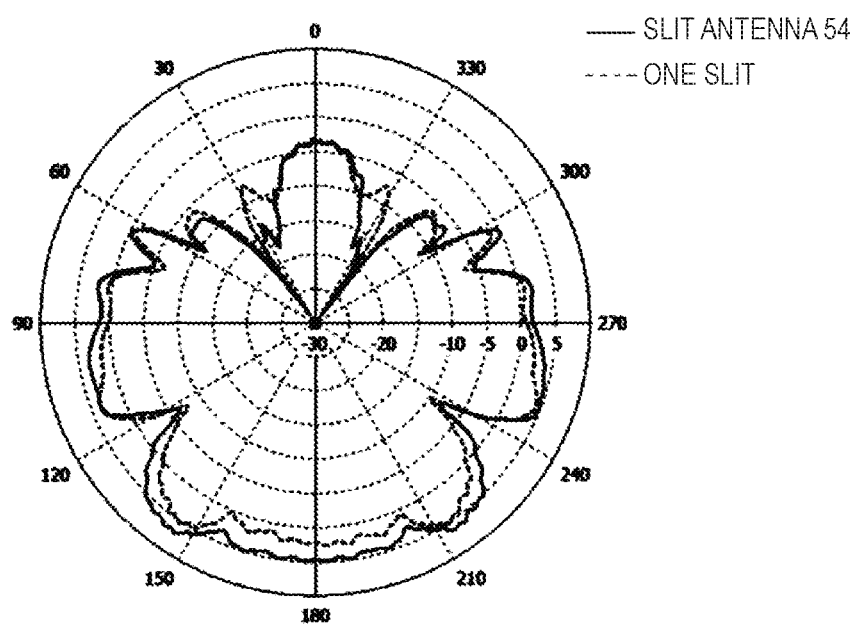
FIG. 8 is a directivity characteristic diagram, produced by simulations, showing horizontal plane directivity characteristics (a slit antenna elevation angle: 0°) of the antenna board employed in the first embodiment and an antenna board in which a slit antenna having only one slit is formed.

FIG. 8 is a directivity characteristic diagram, produced by simulations, showing horizontal plane directivity characteristics (the elevation angle: 0°) at a frequency 5,887.5 MHz of the antenna board 5 employed in the first embodiment and an antenna board in which a slit antenna having only one slit is formed. The characteristic of the antenna board 5 is represented by a solid line in FIG. 8 and the characteristic of the antenna board in which the slit antenna having only one slit is formed is represented by a dotted line in FIG. 8. The horizontal plane corresponds to the elevation angle 0° and the rear direction of the antenna device 1 corresponds to the azimuth angle 180°. The average gain of the slit antenna 54 which is provided in the antenna board 5 in an azimuth angle range 90° to 270° (the elevation angle: 0°) is 3.7 dBi, and the average gain of the slit antenna having only one slit in an azimuth angle range 90° to 270° (the elevation angle: 0°) is 2.0 dBi. As shown in FIG. 8, the average gain in the azimuth angle range 90° to 270° (the elevation angle: 0°) of the slit antenna 54 is larger than that of the slit antenna having only one slit.

Figure 9:
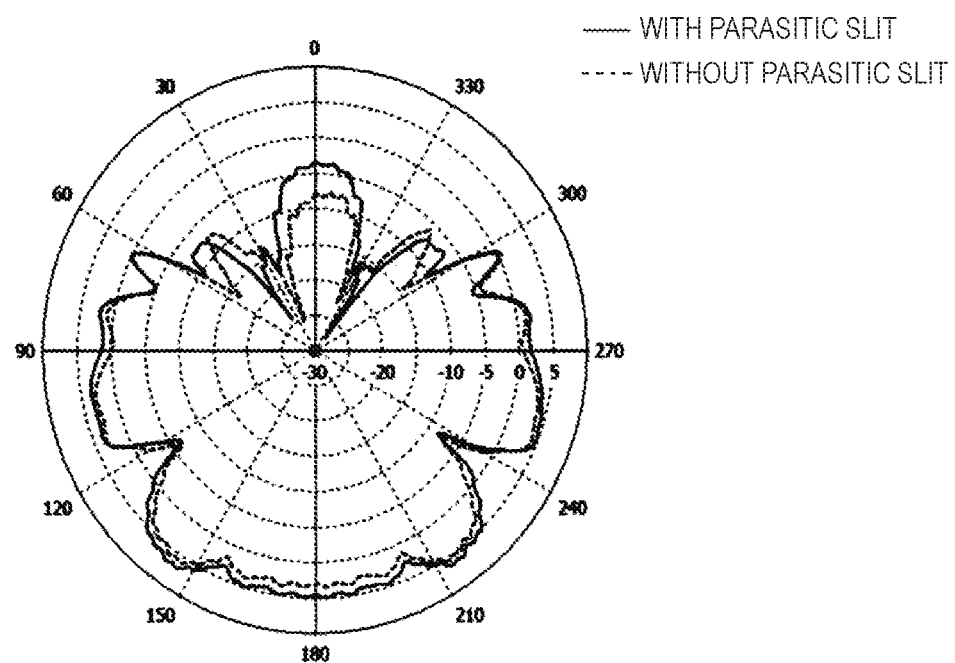
FIG. 9 is a directivity characteristic diagram, produced by simulations, showing horizontal plane directivity characteristics (the slit antenna elevation angle: 0°) of the antenna hoard employed in the first embodiment and an antenna board in which a parasitic slit is not provided.

FIG. 9 is a directivity characteristic diagram, produced by simulations, showing horizontal plane directivity characteristics (the elevation angle: 0°) at a frequency 5,887.5 MHz of the antenna board 5 employed in the first embodiment and an antenna board without a parasitic slit. The characteristic of the antenna board 5 is represented by a solid line in FIG. 9 and the characteristic of the antenna board without a parasitic slit is represented by a dotted line in FIG. 9. The average gain of the antenna board 5 with the parasitic slit 56 in an azimuth angle range 90° to 270° (the elevation angle: 0°) is 3.7 dBi, and the average gain of the antenna board without a parasitic slit in an azimuth angle range 90° to 270° (the elevation angle: 0°) is 2.7 dBi. Where the parasitic slit 56 is provided, the coupling between the first slit 55 and the second slit 57 is weakened. As shown in FIG. 9, the average gain in the azimuth angle range 90° to 270° (the elevation angle: 0°) of the slit antenna 54 with the parasitic slit 56 is larger than that of the slit antenna without the parasitic slit 56.

Figure 10:
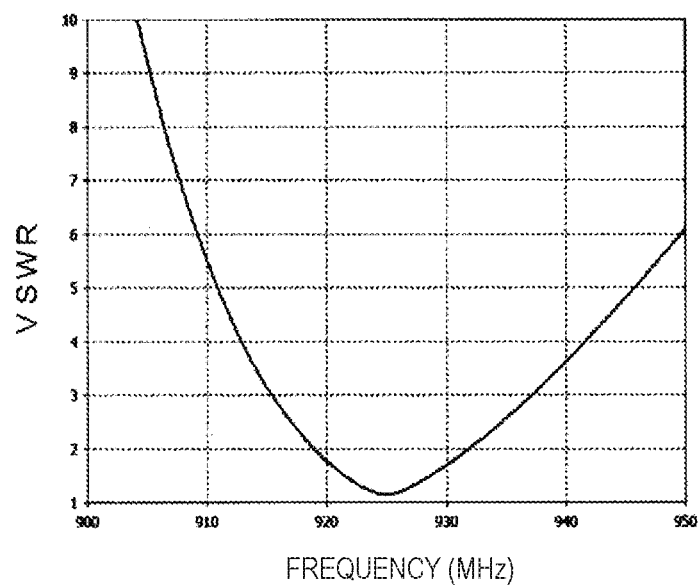
FIG. 10 is a VSWR characteristic diagram of the antenna board employed in the first embodiment in a case that a feeding end portion (a feeding point) is different from the slit antenna

FIG. 10 is a VSWR characteristic diagram of the antenna board 5 employed in the first embodiment in a case that the feeding end portion is different from the slit antenna 54, that is, the second feeding end portion 61 is used. As shown in FIG. 10, the antenna board 5 operates even at frequencies of the 925-MHz band (VSWR is close to 1 in the 925-MHz hand). It is therefore unnecessary to provide an antenna for a remote control system separately and hence the antenna device 1 can be miniaturized.

Figure 11:
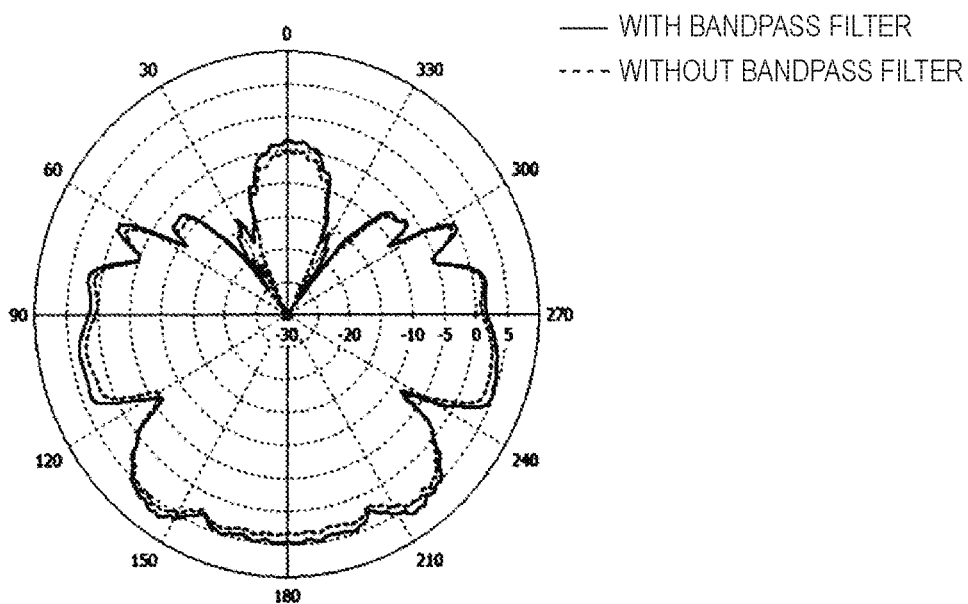
FIG. 11 is a directivity characteristic diagram, produced by simulations, showing horizontal plane directivity characteristics (an elevation angle: 0°) of the antenna board employed in the first embodiment in a case that a bandpass filter that makes the voltage of the feeding end portion that is different from the slit antenna equal to the ground (GND) level at an operation frequency of the slit antenna is provided and a case that the bandpass filter is not provided.

FIG. 11 is a directivity characteristic diagram, produced by simulations, showing horizontal plane directivity characteristics (the elevation angle: 0°) at a frequency 5,887.5 MHz of the antenna board 5 employed in the first embodiment in a case that the bandpass filter 80 that makes the voltage of the second feeding end portion 61 that is different from the slit antenna 54 equal to the ground level at an operation frequency of the slit antenna 54 is provided and a case that the bandpass filter 80 is not provided. Where the bandpass filter 80 is provided (a solid line in FIG. 11), the average gain in an azimuth angle range 90° to 270° (the elevation angle: 0°) is 3.7 dBi. Where the bandpass filter 80 is not provided (a dotted line in FIG. 11), the average gain in an azimuth angle range 90° to 270° (the elevation angle: 0°) is 2.7 dBi. Where the bandpass filter 80 is provided, a signal in a V2X communication frequency band in which the antenna board 5 operates as a slit antenna flows to the ground via the bandpass filter 80. By virtue of the use of the bandpass filter 80, the average gain of the slit antenna 54 of the first embodiment in the azimuth angle range 90° to 270° (the elevation angle: 0°) is larger than in the case without the bandpass filter 80.

This embodiment provides the following advantages:

(1) The antenna board 5 is configured such that the linear element 50 is provided on a first surface of the dielectric substrate 11, the slit antenna 54 is provided on a second surface that is opposite to the first surface, and the linear element 50 overlaps with the slits 55 and 57 of the slit antenna 54 when the first surface and the second surface are superimposed on each other. As a result, it is possible to cause the slit antenna to operate without the need for providing a transmission line on the second surface of the dielectric substrate 11 and a structure is obtained that the linear element 50 is involved in the slit antenna. The linear element 50 can be designed more easily than the transmission line of dipole antenna and the antenna device 1 can be designed more easily than an antenna device that is equipped with a dipole antenna.

(2) Since the slit antenna 54 has two slits, that is, the first slit 55 and the second slit 58, which are spaced from each other by λ/2, the average gain in an azimuth angle range 90° to 270° (the elevation angle: 0°) can be made larger than in a slit antenna having only one slit.

(3) In the slit antenna 54, the coupling between the first slit 55 and the second slit 57 can be made weaker because the parasitic slit 56 is provided between the first slit 55 and the second slit 57. The average gain in an azimuth angle range 90° to 270° (the elevation angle: 0°) can be made larger than in a slit antenna without the parasitic slit 56. The parasitic slit 56 need not always be provided at the center between the first slit 55 and the second slit 57 in the height direction; it suffices that the parasitic slit 56 be provided between the first slit 55 and the second slit 57.

(4) The first feeding end portion 60 which is the point for feeding power from the circuit board 10 to the linear element 50 is located on the bottom edge of the antenna board 5. The first slit 55 is located over the second slit 57, and in the antenna board 5 the length of the second branch linear element portion 53 from the point where it branches off the common linear element portion 51 to the second crossing point 59 is set shorter than the length of the first branch linear element portion 52 from the point where it branches off the common linear element portion 51 to the first crossing point 58. With this measure, the layout of the linear element 50 can be made simpler than in a case that the length of the first branch linear element portion 52 from the point where it branches off the common linear element portion 51 to the first crossing point 58 is equal to the length of the second branch linear element portion 53 from the point where it branches off the common linear element portion 51 to the second crossing point 59 (e.g., second embodiment shown in FIG. 12).

(5) The first branch linear element portion 52 gets across the first slit 55 from below to above and the second branch linear element portion 53 gets across the second slit 57 from above to below. As a result, the length of the second branch linear element portion 53 from the point where it branches off the common linear element portion 51 to the second crossing point 59 is set shorter than the length of the first branch linear element portion 52 from the point where it branches off the common linear element portion 51 to the first crossing point 58 by $\lambda/2$ (this is to make the phase at the first crossing point 58 opposite to the phase at the second crossing point 59). With this measure, the average gain in an azimuth angle range 90° to 270° (the elevation angle: 0°) can be made larger than in a case that the length of the first branch linear element portion 52 from the point where the first branch linear element portion 52 branches off the common linear element portion 51 to the first crossing point 58 is equal to the length of the second branch linear element portion 53 from the point where it branches off the common linear element portion 51 to the second crossing point 59 (e.g., second embodiment shown in FIG. 12). Furthermore, the linear element 50 can be shortened, whereby the loss due to the linear element 50 can be reduced. And the antenna board 5 can be shortened in the front-rear direction, whereby the antenna device 1 can be miniaturized.

(6) The antenna board 5 operates as a monopole antenna not only at frequencies in the 5.9-GHz band that are used for V2X communication but also at frequencies in the 925-MHz band that are used in remote control systems. Thus, it is not necessary to provide an antenna for a remote control system separately, whereby the antenna device 1 can be miniaturized.

(7) The bandpass filter 80 capable of passing a signal in a frequency band for V2X communication is disposed in the vicinity of the second feeding end portion 61, whereby the voltage of the second feeding end portion 61 and the second conductor pattern 72 can be made substantially equal to the ground level in the 5.9-GHz band in the frequency band for V2X communication. Thus, the antenna board 5 can operate as the slit antenna 54 for V2X communication satisfactorily even in a case that the antenna board 5 is also used as a monopole antenna for a remote control system.

(8) The antenna board 5 is spaced from the capacitance loading element 31 of the AM/FM broadcast reception antenna 3 in the front-rear direction of the antenna board 5. However, since the capacitance loading element 31 functions as a reflector, the directivity characteristic can be improved on the side where the capacitance loading element 31 does not exist.

Embodiment 2

Figure 12:
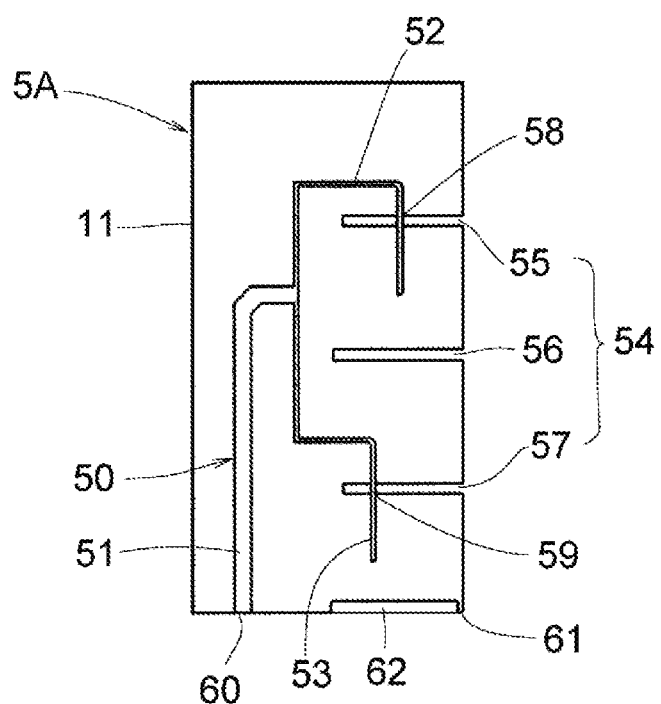
FIG. 12 is an explanatory diagram showing an antenna board 5A employed in the second embodiment and is a superimposition of a left side view and a right side view of the antenna board

FIG. 12 is an explanatory diagram showing an antenna board 5A employed in the second embodiment and is a superimposition of a left side view and a right side view of the antenna board 5A. Whereas the same slit antenna 54 as employed in the first embodiment is employed in the second embodiment, the second embodiment is different from the first embodiment in that the first branch linear element portion 52 and the second branch linear element portion 53 cross (overlap with) the firsts slit 55 and the second slit 57, respectively, from above to below. To make the first slit 55 and the second slit 57 in phase, it is necessary to set the first crossing portion 58 and the second crossing portion 59 in phase. To this end, the length of the first branch linear element portion 52 from the point where it branches off the common linear element portion 51 to the first crossing portion 58 is set equal to the length of the second branch linear element portion 53 from the point where it branches off the common linear element portion 51 to the second crossing point 59. The other part of the configuration is the same in the above-described first embodiment.

Figure 13:
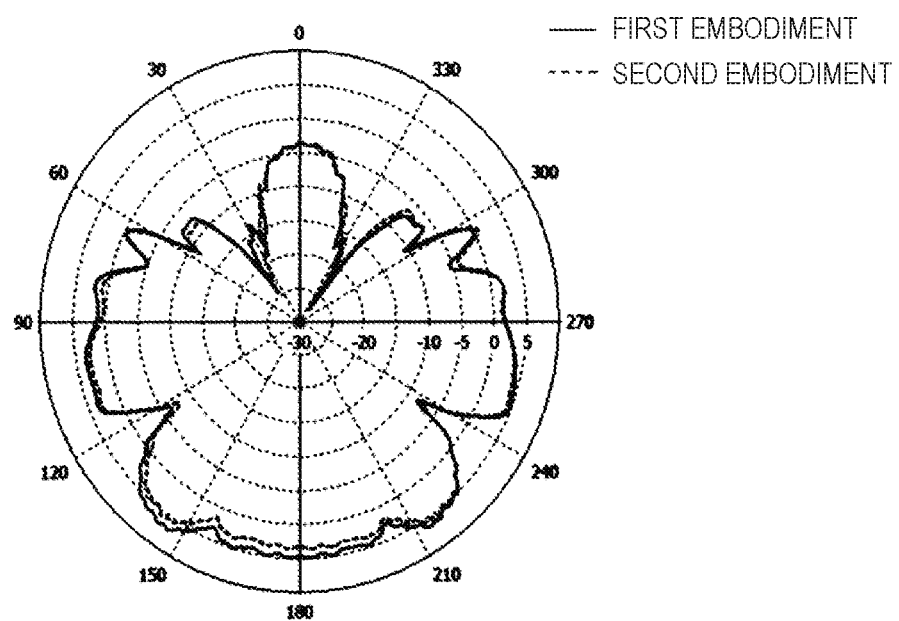
FIG. 13 is a directivity characteristic diagram, produced by simulations, showing horizontal plane directivity characteristics (the elevation angle: 0°) at a frequency 5,887.5 MHz of the antenna board 5 employed in the first embodiment and the antenna board 5A employed in the second embodiment.

FIG. 13 is a directivity characteristic diagram, produced by simulations, showing horizontal plane directivity characteristics (an elevation angle of the slit antenna 54: 0°) at a frequency 5,887.5 MHz of the antenna board 5 employed in the first embodiment and the antenna board 5A employed in the second embodiment. In the antenna board shown in FIG. 7, the length of a portion, from the point of branching off the common linear element portion 51 to the second crossing portion 59, of the second branch linear element portion 53 is shorter than the length of a portion, from the point of branching off the common linear element portion 51 to the first crossing portion 58, of the first branch linear element portion 52 by $\lambda/2$. In contrast, in the antenna board 5A shown in FIG. 12, the length of the portion, from the point of branching off the common linear element portion 51 to the first crossing portion 58, of the first branch linear element portion 52 is the same as the length of the portion, from the point of branching off the common linear element portion 51 to the second crossing portion 59, of the second branch linear element portion 53.

In the characteristic of the antenna board 5 represented by a solid line in FIG. 13 (the length of the portion, from the point of branching off the common linear element portion 51 to the second crossing portion 59, of the second branch linear element portion 53 is shorter than the length of the portion, from the point of branching off the common linear element portion 51 to the first crossing portion 58, of the first branch linear element portion 52 by $\lambda/2$), an average gain in an azimuth angle range 90° to 270° (the elevation angle: 0°) is 3.7 dBi. On the other hand, in the characteristic of the antenna board 5A represented by a dotted line in FIG. 13 (the length of the portion, from the point of branching off the common linear element portion 51 to the first crossing portion 58, of the first branch linear element portion 52 is equal to the length of the portion, from the point of branching off the common linear element portion 51 to the second crossing portion 59, of the second branch linear element portion 53), an average gain in an azimuth angle range 90° to 270° (the elevation angle: 0°) is 2.8 dBi. As seen from FIG. 13, the antenna board 5 employed in the first embodiment in which the second branch linear element portion 53 is shorter by $\lambda/2$ has a larger average gain in the azimuth angle range 90° to 270° (the slit antenna elevation angle: 0°) than the antenna board 5A in the second embodiment in which the second branch linear element portion 53 has equal length. In this manner, the length of the linear element 50 of the antenna board 5 is shorter than the length of the linear element 50 of the antenna board 5A, whereby the loss of the linear element 50 is reduced and the antenna device 1 can be miniaturized by shortening the antenna board 5 in the front-rear direction (its width direction). That is, an average gain in the azimuth angle range 90° to 270° (the elevation angle: 0°) of the antenna board 5A according to the second embodiment is smaller than in the first embodiment though it is sufficiently larger than an average gain in the remaining azimuth angle range.

Embodiment 3

Figure 14:
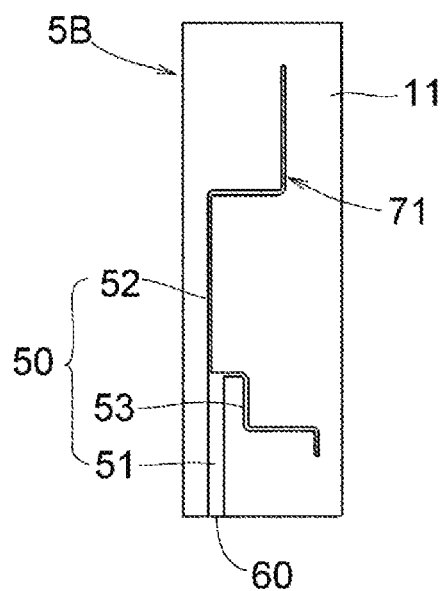
FIG. 14 is a left side view, with its head located on the front side, of an antenna board employed in a third embodiment in which a slit antenna is provided.
Figure 15:
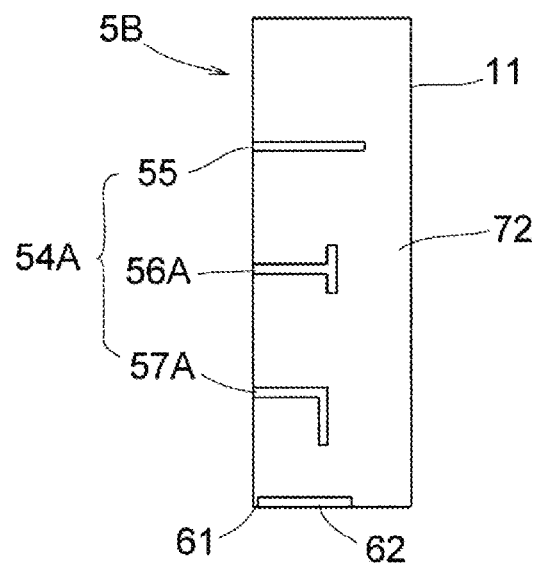
FIG. 15 is a right side view, with its head located on the front side, of the same.
Figure 16:
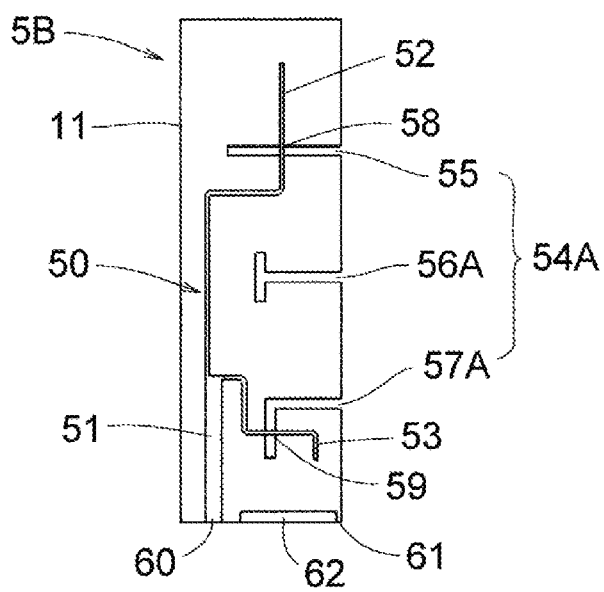
FIG. 16 is an explanatory diagram that is a superimposition of the left side view (FIG. 14) and the right side view (FIG. 15) of the antenna board.

FIGS. 14-16 show an antenna board 5B employed in a third embodiment of the present invention. The antenna board 5B is different from the antenna board 5 employed in the first embodiment in the shapes of the lower slit and the parasitic slit that constitute the slit antenna and the shape of the linear element is different than in the antenna board 5 accordingly. That is, a slit antenna 54A has a first slit 55, and parasitic slit 56A, and a second slit 57A, a front end portion of the parasitic slit 56A is bent upward and downward so that the parasitic slit 56A assumes a T-shape, and the second slit 57A is bent downward so as to assume an L shape. The sum of the length of the parasitic slit 56A in the front-rear direction and its length in the top-bottom direction is $\lambda/4$. The length of the second slit 57A including the length of the bent portion is $\lambda/4$. The second branch linear element portion 53 is also bent once additionally so as to be suitable for the shape of the second slit 57A. The other part of the configuration is the same as in the first embodiment.

As described above, since the parasitic slit 56A and the second slit 57A are deformed so that their lengths in the front-rear direction are shortened, the length of the antenna board 5B in the front-rear direction can be made shorter than in the antenna board 5. Whereas the length of the antenna board 5 in the front-rear direction is 22 mm, the length of the antenna board 5B in the front-rear direction is 17 mm.

Embodiment 4

Figure 19:
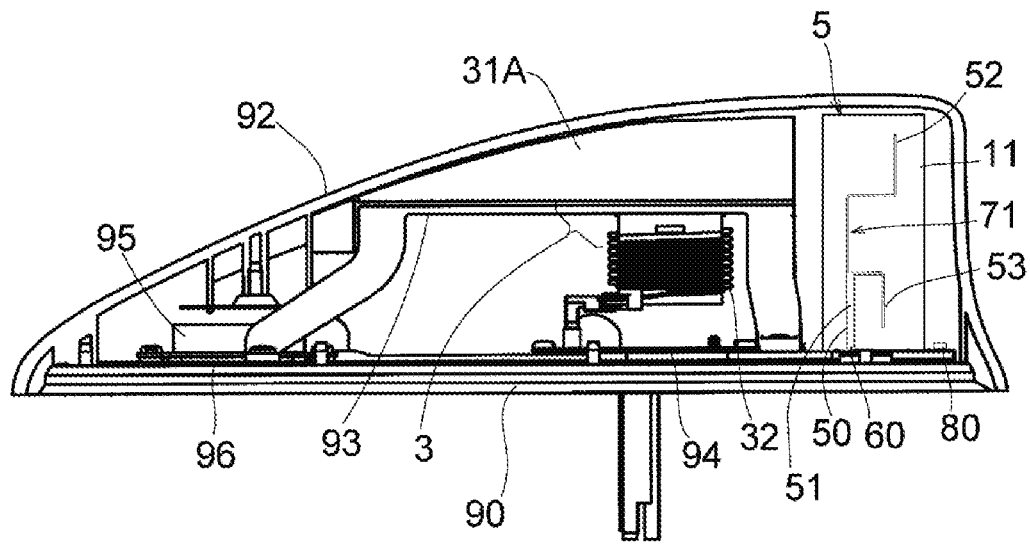
FIG. 19 is a left side view, with its head located on the front side, of a vehicular antenna device according to a fourth embodiment of the invention.
Figure 20:
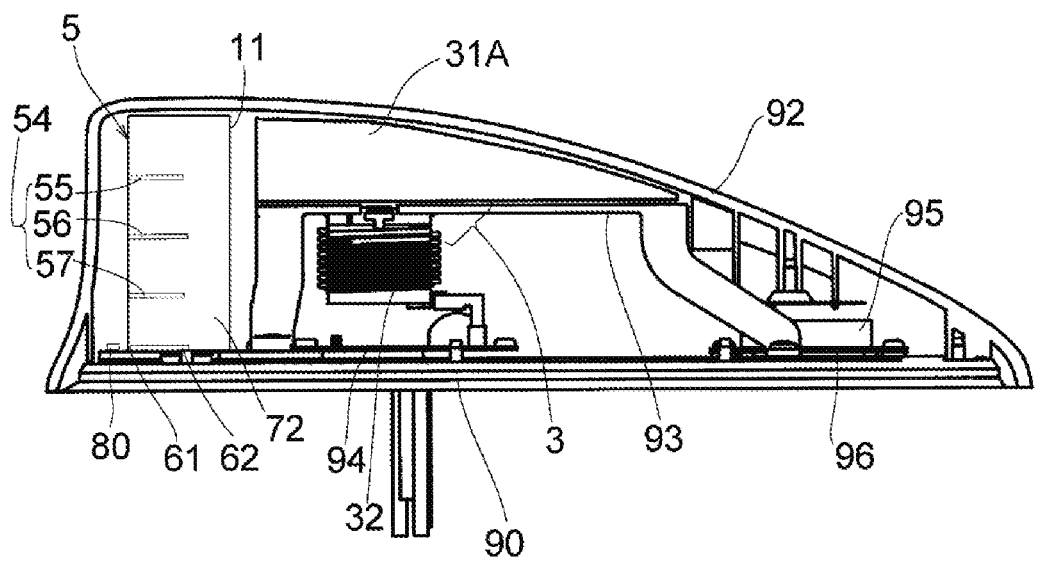
FIG. 20 is a right side view, with its head located on the front side, of the same.

An antenna device according to a fourth embodiment of the invention will be described with reference to FIGS. 19 and 20. As shown in these drawings, the vehicular antenna device 1A includes a metal base 90 and a radio wave transmissive case (a radome) 92 which is screwed to the base 90 so as to cover the base 90 from above. An SDARS antenna (a patch antenna) 95, an AM/FM broadcast reception antenna 3, and an antenna board 5 in which a V2X communication slit antenna is provided are installed in an internal space defined by the base 90 and the case 92 so as to be arranged in this order from the front side. The SDARS antenna 95 is equipped with a radiation electrode on a top surface and has upward directivity, and is fixed to the base 90 via a board 96.

The fourth embodiment is different from the above-described first embodiment in that a capacitance loading element 31A of the AM/FM broadcast reception antenna 3 is an umbrella-shaped conductor plate and has a structure which is not divided. The capacitance loading element 31A extends alongside and is fixed to a holder 93 which is erected from and fixed to the base 90. A coil 32 is attached to the holder 93, the top end of the coil 32 is connected to the capacitance loading element 31A, and the bottom end of the capacitance loading element 31A is connected to an amplifier board 94 which is fixed to the case 90.

As shown in FIGS. 17 and 18, if the patch antenna having the upward directivity is disposed at a low position so as to be covered with the capacitance loading element 31A having the structure which is not divided, both of the axial ratio and the gain are degraded. Thus, in the fourth embodiment, the SDARS antenna 95 is disposed at a front position so as not to be covered with the capacitance loading element 31A. In the other part, the configuration and the workings and advantages are the same as in the first embodiment.

Although the invention has been described above using the embodiments as examples, it would be understood by those skilled in the art that the individual constituent elements and treatment/working processes of the embodiments can be modified in various manners within the confines of the claims. Modifications will be described below.

In the antenna board 5 employed in the first embodiment, the first branch linear element portion 52 gets across the first slit 55 at the first crossing portion 58 from below to above and the second branch linear element portion 53 gets across the second slit 57 at the second crossing portion 59 from above to below. However, whether the first branch linear element portion 52 is to get across the first slit 55 at the first crossing portion 58 in extending upward or downward and the second branch linear element portion 53 is to get across the second slit 57 at the second crossing portion 59 in extending upward or downward can be determined as desired. However, the length of the first branch linear element portion 52 from the point where it branches off the common linear element portion 51 to the first crossing portion 58 and the length of the second branch linear element portion 53 from the point where it branches off the common linear element portion 51 to the second crossing portion 59 are set so that the first slit 55 and the second slit 57 are in phase.

Although the antenna board 5 employed in the first embodiment is configured so as to operate at frequencies in the 925-MHz band for remote control systems in addition to frequencies in a frequency band for V2X communication, it may be configured so as to operate at frequencies in the 700 MHz to 2.7 GHz band for TEL. The antenna board 5 may be configured so as to operate at frequencies in another band.

Although in the antenna board 5 employed in the first embodiment the interval between the first slit 55 and the second slit 57 is $\lambda/2$, it may be longer than $\lambda/2$. In this case, the distance from the first feed end portion 60 of the linear element 50 to the second crossing portion 59 may be set shorter than the distance from the first feed end portion 60 to the first crossing portion 58 by an odd number (larger than or equal to 1) multiple of $\lambda/2$.

Although in the antenna board 5A employed in the second embodiment the interval between the first slit 55 and the second slit 57 is $\lambda/2$, it may be longer than $\lambda/2$. In this case, the distance from the first feed end portion 60 of the linear element 50 to the second crossing portion 59 may be set shorter than the distance from the first feed end portion 60 to the first crossing portion 58 by an integer (larger than or equal to 1) multiple of $\lambda$.

Although in the embodiments a rectangular shape, T shape, and an L shape were employed as example slit shapes, the slit shape is not limited to them; for example, a cruciform shape or a rectangle whose corners are rounded may be employed.

Although in each embodiment the linear element 50 and the slit antenna 54 or 54A (the second conductor pattern 72) are provided on the two respective surfaces of the dielectric substrate, both of a linear element and a slit antenna may be provided on one surface of the dielectric substrate. In this case, no conductor pattern is provided around the linear element 50.

Although in each embodiment the linear element 50 and the slit antenna 54 or 54A are provided on the dielectric substrate, another structure not using a dielectric substrate is possible in which a linear conductor having the same shape as the linear element 50 is erected from the circuit board 10 and used as the linear element 50 and a plate-like thin-plate conductor provided with slits having the same shapes as the slits of the slit antenna 54 or 54A is used as the slit antenna 54 or 54A. In this case, it is necessary to form a gap between the linear conductor and the thin-plate conductor.

Although in the first embodiment the antenna device 1 is equipped with the GNSS antenna 2, the AM/FM broadcast reception antenna 3, and the antenna board 5 in which the V2X communication antenna 54 is provided, one or both of the GNSS antenna 2 and the AM/FM broadcast reception antenna 3 may be omitted if necessary. An antenna having another function may be used in place of the GNSS antenna 2 or the AM/FM broadcast reception antenna 3.

Although in each embodiment the slit antenna having plural slits is provided in the antenna board, a slit antenna having only one slit that is not a parasitic slit may be provided in the antenna board if no problem arises in the gain of the slit antenna. Furthermore, in each embodiment, a slit antenna having three or more slits that are not a parasitic slit may be provided in the antenna board. Although in each embodiment the slit antenna provided in the antenna board has the parasitic slit, the slit antenna may not include a parasitic slit if no problem arises in the gain of the slit antenna. Although the bandpass filter 80 is provided in each embodiment, the bandpass filter 80 may be omitted if no problem arises in the gain of the slit antenna.

DESCRIPTION OF SYMBOLS 1, 1A: Vehicular antenna device
2: GNSS antenna
3: AM/FM broadcast reception antenna
5, 5A, 5B: Antenna hoard
10: Circuit board
11: Dielectric substrate
31: Capacitance loading element
32: Coil
50: Linear element, 51: Common linear element portion
52, 53: Branch linear element portion
54, 54A: Slit antenna
55, 57, 57A: Slit
56, 56A: Parasitic slit
58, 59: Crossing portion
60, 61: Feeding end potion
72: First conductor pattern
72: Second conductor pattern
80: Lowpass filter

The invention claimed is:

1. An antenna device comprising:
a first antenna comprising an antenna board in which a conductor pattern is provided on each of both surfaces of a dielectric substrate; and
a second antenna configured to receive a signal of a frequency that is different from a frequency of the first antenna, wherein
a linear element is provided on a first surface of the dielectric substrate,
a slit antenna is provided on a second surface of the dielectric substrate opposite to the first surface,
when the first surface and the second surface are superimposed on each other, the linear element and a slit of the slit antenna overlap with each other, and
the antenna board is spaced from the second antenna in a front-rear direction of the antenna board,
the slit antenna has a first slit that overlaps with the linear element at a first crossing portion and a second slit that overlaps with the linear element at a second crossing portion when the first surface and the second surface are superimposed on each other, and
a direction in which the linear element gets across the first slit is the same as a direction in which the linear element gets across the second slit, and a distance from a feeding point of the linear element to the second crossing portion is equal to a distance from the feeding point to the first crossing portion.

2. The antenna device according to claim 1, wherein the slit antenna includes plural slits.

3. The antenna device according to claim 1, wherein the slit antenna includes a parasitic slit that does not overlap with the linear element when the first surface and the second surface are superimposed on each other.

4. The antenna device according to claim 1, wherein the antenna hoard operates at a frequency that is different from an operation frequency of the slit antenna.

5. The antenna device according to claim 1, wherein the second antenna comprises a capacitance loading element, and
the antenna board is spaced from the capacitance loading element in the front-rear direction of the antenna board.

6. An antenna device comprising:
a first antenna comprising an antenna board in which a conductor pattern is provided on each of both surfaces of a dielectric substrate; and
a second antenna configured to receive a signal of a frequency that is different from a frequency of the first antenna, wherein
a linear element is provided on a first surface of the dielectric substrate,
a slit antenna is provided on a second surface of the dielectric substrate opposite to the first surface,
when the first surface and the second surface are superimposed on each other, the linear element and a slit of the slit antenna overlap with each other, and
the antenna board is spaced from the second antenna in a front-rear direction of the antenna board,
the antenna hoard is erected perpendicular to and fixed to an attachment member,
the slit antenna has a first slit that overlaps with the linear element at a first crossing portion and a second slit that overlaps with the linear element at a second crossing portion when the first surface and the second surface are superimposed on each other,
a distance from a feeding point, located on a side of the attachment member, of the linear element to the second crossing portion is shorter than a distance from the feeding point to the first crossing portion,
when the first surface and the second surface are superimposed on each other, a direction in which the linear element gets across the first slit is opposite to a direction in which the linear element gets across the second slit, and
the distance from the feeding point of the linear element to the second crossing portion is shorter than the distance from the feeding point to the first crossing portion by an odd number multiple of $\lambda/2$, where the odd number is larger than or equal to 1 and $\lambda$ is an effective wavelength of an operation frequency of the slit antenna.

7. An antenna device comprising:
a first antenna comprising an antenna hoard in which a conductor pattern is provided on each of both surfaces of a dielectric substrate; and
a second antenna configured to receive a signal of a frequency that is different from a frequency of the first antenna, wherein
a linear element is provided on a first surface of the dielectric substrate,
a slit antenna is provided on a second surface of the dielectric substrate opposite to the first surface,
when the first surface and the second surface are superimposed on each other, the linear element and a slit of the slit antenna overlap with each other, and
the antenna hoard is spaced from the second antenna in a front-rear direction of the antenna board, the antenna board is erected perpendicular to and fixed to an attachment member, the slit antenna has a first slit that overlaps with the linear element at a first crossing portion and a second slit that overlaps with the linear element at a second crossing portion when the first surface and the second surface are superimposed on each other, a distance from a feeding point, located on a side of the attachment member, of the linear element to the second crossing portion is shorter than a distance from the feeding point to the first crossing portion, when the first surface and the second surface are superimposed on each other, a direction in which the linear element gets across the first slit is the same as a direction in which the linear element gets across the second slit, and the distance from the feeding point of the linear element to the second crossing portion is shorter than the distance from the feeding point to the first crossing portion by an integer multiple of $\lambda$, where the integer is larger than or equal to 1 and $\lambda$ is an effective wavelength of an operation frequency of the slit antenna.

8. An antenna device comprising:

a first antenna comprising an antenna hoard in which a conductor pattern is provided on each of both surfaces of a dielectric substrate; and a second antenna configured to receive a signal of a frequency that is different from a frequency of the first antenna, wherein a linear element is provided on a first surface of the dielectric substrate, a slit antenna is provided on a second surface of the dielectric substrate opposite to the first surface, when the first surface and the second surface are superimposed on each other, the linear element and a slit of the slit antenna overlap with each other, and the antenna board is spaced from the second antenna in a front-rear direction of the antenna board, the second antenna comprises a capacitance loading element, and the antenna board is spaced from the capacitance loading element in the front-rear direction of the antenna board.

* * * * *